Patented Jan. 1, 1952

2,580,468

UNITED STATES PATENT OFFICE 2,580,468

METHOD OF PREPARING AN ISOCYANATE

Frederic C. Schaefer and Erhart K. Drechsel, Stamford, Conn., assignors to American Cyanamid Company, New York, N. Y., a corporation of Maine No Drawing. Application August 13, 1949, Serial No. 110,224

9 Claims. (Cl. 260—453)

1

This invention relates to the preparation of isocyanates (isocyanic esters), and more particularly to a new and improved method of preparing aliphatic hydrocarbon isocyanates, specifically alkyl and cycloalkyl isocyanates, alkenyl and cycloalkenyl isocyanates, aralkyl isocyanates and aralkenyl isocyanates. The invention is especially concerned with the preparation of such isocyanates which comprises pyrolyzing the corresponding tri-(aliphatic hydrocarbon) isocyanurate under anhydrous conditions in the presence of a strong, non-oxidizing acid, more particularly a hydrogen halide and specifically hydrogen chloride, at a temperature of at least 120° C., preferably at least about 170°–180° C., but below the temperature of decomposition of the isocyanate which is formed, e. g., about 600° C., and isolating the said isocyanate, e. g., by distillation and condensation of the distillate.

It was known prior to our invention that aliphatic esters of isocyanic acid could be prepared by reaction between an aliphatic sulfate and potassium cyanate, as well as by phosgenation of an amine corresponding to the desired isocyanate. It also has been suggested that such esters could be prepared by pyrolyzing an N-alkyl, N-alkoxyalkyl or N-alkoxyalkoxyalkyl carbamate, followed by separation of the isocyanic ester from the pyrolysis products before the latter have had time to reunite and form the starting N-substituted carbamate.

It is a primary object of the present invention to provide a new and improved method or process of preparing aliphatic hydrocarbon isocyanates. Another object of the invention is to prepare such isocyanates by a relatively simple and inexpensive process from the corresponding isocyanurates. A further object of the invention is to obtain more valuable products from a by-product of other chemical reactions and which has only limited utility as such.

These and other objects are accomplished in practicing this invention by pyrolysis of an isocyanurate corresponding to the aliphatic isocyanate desired, as briefly described in the first paragraph of this specification and more fully hereafter. The reaction is believed to proceed in accordance with the mechanism indicated below:

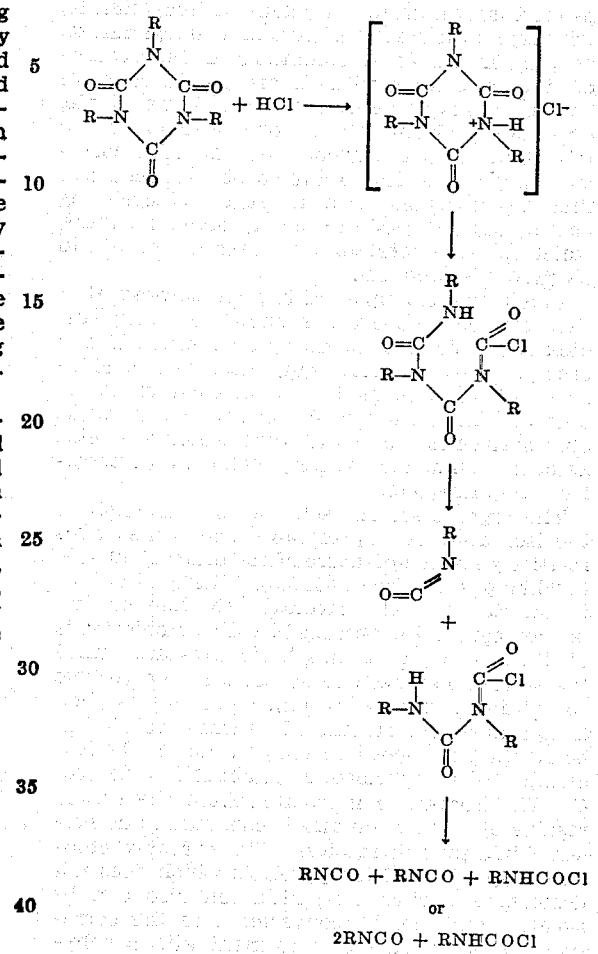

$$RNCO + RNCO + RNHCOCl$$
or
$$2RNCO + RNHCOCl$$

In the above formulas R represents an aliphatic hydrocarbon radical including alkyl (e. g., methyl, ethyl, propyl, isopropyl, n-butyl, isobutyl, sec.-butyl, tert.-butyl, amyl, isoamyl, hexyl, heptyl, octyl, nonyl, decyl, dodecyl, tetradecyl, hexadecyl, octadecyl, etc.); cycloalkyl (e. g., cyclopentyl, cyclohexyl, cycloheptyl, etc.); alkenyl (e. g., allyl, methallyl, ethallyl, crotyl, 2-butenyl, 3-butenyl, 2-pentenyl, 3-pentenyl, 4-pentenyl, 2-hexenyl, 4-hexenyl, 3-methyl-2-butenyl, 3-methyl-3-butenyl, 2-methyl-2-pentenyl, 3-methyl-4-pentenyl, 2-octenyl, 1,3-pentadienyl, 2,4-hexadienyl, 3-nonenyl, 2-decenyl, etc.); cycloalkenyl (e. g., cyclopentenyl, cyclohexenyl, cycloheptenyl, etc.); aralkyl (e. g., benzyl, phenylethyl, phenylpropyl, phenylisopropyl, phenylbutyl, phenylamyl, etc.); and aralkenyl (e. g., cinnamyl, phenylallyl, etc.). The invention is especially applicable to the production of isocyanates by pyrolysis of isocyanurates represented by the above formula for the starting material and wherein R represents an aliphatic hydrocarbon radical containing from 1 to about 10 carbon atoms, inclusive.

The isocyanurates which are subjected to pyrolsis in accordance with the present invention can be prepared by methods such as are described in the literature; or, if desired, they can be produced by the method disclosed and claimed in the copending application of Donald W. Kaiser and Dagfrid Holm-Hansen Church, Serial No. 106,976, filed July 26, 1949, now Patent No. 2,536,849, dated January 2, 1951.

The pyrolysis of the tri-(aliphatic hydrocarbon) isocyanurate, e. g., triallyl isocyanurate, tri-n-butyl isocyanurate, tricyclohexyl isocyanurate, tribenzyl cyanurate, tricinnamyl isocyanurate, etc., under anhydrous conditions in the presence of (i. e., in contact with) hydrogen chloride can be effected in any desired manner. For example, an organic solvent solution or dispersion of the tri-(aliphatic hydrocarbon) isocyanurate corresponding to the isocyanate to be produced can first be saturated with hydrogen chloride by passing dry HCl gas into the dry organic solvent, which latter is inert to the isocyanurate and to its pyrolysis products.

Illustrative examples of organic solvents that thus can be used are benzene, toluene, xylene, dioxane, ethers such as diisopropyl ether, dibutyl ether, etc., esters such as butyl acetate, etc., chlorinated hydrocarbons, for instance carbon tetrachloride, trichloroethylene, ethylene dichloride, chlorobenzenes such as 1,3-dichlorobenzene, etc., ketones such as methyl ethyl ketone, etc., petroleum naphtha, etc.

The organic solvent solution or dispersion of the isocyanurate is preferably maintained at a relatively low temperature of the order of 10°–30° C. while passing the dry HCl gas therein in order to saturate it. The saturated solution or dispersion containing absorbed hydrogen chloride is distilled (e. g., at atmospheric pressure) until the solvent has been removed, and the residue containing absorbed hydrogen chloride is then heated at a temperature of at least 120° C. but below the decomposition temperature of the isocynate which is formed, e. g., about 500° to 600° C. The isocyanate is isolated from the heated residue by distillation and is condensed and collected in a suitable receiver. The carbamyl chloride by-product of the pyrolysis which does not decompose during the distillation also can be isolated, and can be converted into the corresponding isocyanate by treatment with a dehydrohalogenating agent, thereby increasing the overall yield of isocyanate from the starting isocyanurate.

Alternatively, the aliphatic hydrocarbon isocyanate can be prepared by passing dry hydrogen chloride gas into the corresponding tri-(aliphatic hydrocarbon) isocyanurate (alone or in solution or dispersion in an inert organic solvent) while heating the latter at a temperature of at least 120° C. but below the temperature of decomposition of the isocyanate which is formed, e. g., at a temperature not higher than about 600° C., and recovering the isocyanate, e. g., by fractional condensation of the evolved pyrolysis products.

The pyrolysis of the isocyanurate is preferably effected while it is in a liquid phase, although pyrolysis of the isocyanurate in a vapor phase is not precluded. In either case, the pyrolysis can be effected in the presence of inert liquid solvents (e. g., benzene, toluene, xylene, etc.) or gaseous diluents (e. g., nitrogen, carbon dioxide, helium, argon, etc.) or other adjuvants or catalysts for the reaction (e. g., chlorine, etc.).

The amount of hydrogen chloride employed may be varied as desired or as conditions may require, but advantageously it is present in an amount corresponding to at least 1 mole thereof (e. g., from 1 to 20 or more moles thereof) per mole of isocyanurate. If lower amounts of hydrogen chloride are used, e. g., from 0.1 to 0.95 moles of HCl per mole of isocyanurate, a lower percentage conversion of the isocyanurate to the isocyanate results.

As has been indicated hereinbefore, the pyrolysis temperatures can be considerably varied with in the range of 120° C. to about 600° C. or more, the lower temperatures generally requiring a longer heating period. In the preparation of allyl isocyanate by pyrolysis of triallyl isocyanurate, optimum results have been obtained by heating the latter in the presence of hydrogen chloride at a temperature within the range of 180° C. to 270° C., more particularly 180°–220 C.

The pyrolysis can be effected at atmospheric, subatmospheric or superatmospheric pressure, by batch, semi-continuous or continuous methods, and in any suitable apparatus. For example, pyrolysis can be effected in a vertical or horizontal tubular converter into which the hydrogen chloride and the isocyanurate are charged either continuously or intermittently and either separately or admixed. The converter may be made of any suitable inert material such as glass, quartz, inert metal and the like. If desired, the converter can be packed with suitable packing material, e. g., quartz, silica gel, alumina, porcelain, glass beads, Raschig rings, etc.

Any suitable means may be employed for separating the isocynate from other products of the pyrolysis. For example, in some cases it is more satisfactory to separate the isocyanate by fractional condensation of the evolved pyrolysis products, while in others the pyrolysis products may be collected in a solvent which dissolves the isocyanate to form a separate phase. This phase is then withdrawn and the isocyanate recovered therefrom, as by distillation. The pyrolysis products also can be condensed and collected as a single fraction, and this fraction then distilled to isolate the isocyanate from the other components. If desired, such distillation can be effected while the pyrolysis products are admixed with an inert diluent which forms an azeotropic mixture either with the isocyanate or with the other decomposition products, thereby facilitating the removal of the isocyanate from the pyrolysis products.

In order that those skilled in the art better may understand how the present invention can be carried into effect, the following examples are given by way of illustration and not by way of limitation. All parts are by weight.

*Example 1*

Dry hydrogen chloride gas is passed into a solution of 26.5 parts of triallyl isocyanurate in about 95 parts of dry toluene for 3 hours at 25°–30° C. During the first 30 minutes approximately 4 parts of the said gas is absorbed, and a small amount of heat is evolved. No further absorption of hydrogen chloride takes place. The amount of absorbed HCl as compared with the amount of triallyl isocyanurate in solution is in a molar ratio of 1 mole of the former to about 1.06 moles of the latter.

The solution is then distilled at atmospheric pressure. About 90% of the original amount of toluene is recovered, and a large proportion of the absorbed hydrogen chloride is expelled. The residue, which still contains some absorbed (or combined) hydrogen chloride, is slowly heated to 180° C. while the remainder of the toluene distills very slowly. At 180°–220° C. the residue gives off a low-boiling product and some gas (probably HCl) but, after a few minutes, further heating at about 270°–290° C. merely causes boiling of the unconverted triallyl isocyanurate. The distillate obtained by condensation of the vapors weighs 10 parts and has a strong odor of allyl isocyanate. Upon analysis it is found that this solution contains 0.7 part of allyl isocyanate. This compound is identified by conversion to N-allyl-N'-phenylurea that melts at 105°–106° C. and which does not depress the melting point of a known sample of N-allyl-N'-phenylurea, M. P. 105°–106° C.

*Example 2*

The apparatus employed in this example comprises an inner Pyrex glass tube, 5 mm. O. D., leading almost to the bottom of a 36-inch x 15 mm. O. D. Pyrex glass tube filled to a depth of about 21 inches with triallyl isocyanurate. The dry hydrogen chloride gas is metered from a capillary flowmeter to the smaller or inner tube, and the pyrolysis products are passed from a side arm near the upper end of the larger tube into a "dry ice" (solid carbon dioxide) trap-receiver.

The dry HCl gas is passed at a very low rate (20 cc. per minute) through 51 grams of triallyl isocyanurate (21" depth) heated to about 240° C. After several hours the trap-receiver contains 3 grams of liquid having a strong lachrymatory action. It is identified as allyl isocyante by reaction with aniline and recrystallization of the resulting precipitate of N-allyl-N'-phenylurea.

*Example 3*

Same as in Example 2 with the exception that dry HCl gas at about 50 cc. per minute is passed through 50–55 grams of triallyl isocyanurate heated to 120°–130° C. over a period of 7½ hours. The "dry ice" trap-receiver contains 4 grams of brownish liquid having the characteristic odor of allyl isocyanate.

*Example 4*

Same as in Example 1 with the exception that about 0.106 mole of tri-n-butyl isocyanurate is substituted for 0.106 mole (26.5 parts) of triallyl isocyanurate. The product, n-butyl isocyanate, is identified by conversion to N-n-butyl-N'- phenylurea and comparing the melting point of the latter with the melting point of a known sample of N-n-butyl-N'-phenylurea.

It will be understood, of course, by those skilled in the art that our invention is not limited to the pyrolysis of the particular tri-(aliphatic hydrocarbon) isocyanurates named in the above illustrative examples, since any other isocyanurate of this class similarly can be pyrolyzed to yield varying amounts of the corresponding isocyanate. Examples of such starting isocyanurates have been given hereinbefore, and the names of others will be apparent to those skilled in the art from the general formula for such an isocyanurate as given earlier herein and from the definition of R as given with reference to that general formula. Likewise, the invention is not limited to the particular conditions of pyrolysis described in the various examples, since these conditions can be widely varied as will be clear from the general description of the invention as given in that portion of this specification prior to the examples.

The method of this invention is especially useful as a means of converting the less valuable and less useful tri-(aliphatic hydrocarbon) isocyanurates into more valuable aliphatic hydrocarbon isocyanates that have wider utility in industry than the isocyanurates from which they are produced. The method is relatively simple and inexpensive and, therefore, has obvious advantages over other methods of preparing isocyanates such as those involving phosgenation of the corresponding amine.

We claim:

1. The method of preparing an aliphatic hydrocarbon isocyanate represented by the formula RNCO, where R represents an aliphatic hydrocarbon grouping wherein any unsaturation is ethylenic unsaturation, said method comprising pyrolyzing the corresponding tri-(aliphatic hydrocarbon) isocyanurate under anhydrous conditions in the presence of hydrogen chloride at a temperature of at least 120° C. but below the temperature of decomposition of the isocyanate which is formed, and isolating the said isocyanate.

2. The method of preparing an alyky isocyanate which comprises pyrolyzing the corresponding trialkyl isocyanurate under anhydrous conditions in the presence of hydrogen chloride at a temperature of at least 120° C. but below the temperature of decomposition of the alkyl isocyanate which is formed, and recovering the said alkyl isocyanate.

3. The method of preparing an alkenyl isocyanate which comprises pyrolyzing the corresponding trialkenyl isocyanurate under anhydrous conditions in the presence of hydrogen chloride at a temperature of at least 120° C. but below the temperature of decomposition of the alkenyl isocyanate which is formed, and recovering the said alkenyl isocyanate.

4. The method of preparing allyl isocyanate which comprises pyrolyzing triallyl isocyanurate under anhydrous conditions in the presence of hydrogen chloride at a temperature within the range of 180° C. to 270°, and recovering the allyl isocyanate which is formed.

5. The method of preparing an aliphatic hydrocarbon isocyanate represented by the formula RNCO, where R represents an aliphatic hydrocarbon grouping wherein any unsaturation is ethylenic unsaturation, said method comprising distilling a solution of the corresponding tri-(aliphatic hydrocarbon) isocyanurate in an organic solvent which is inert to the said isocyanurate and its pyrolysis products, said solution containing absorbed hydrogen chloride and said distillation being continued until the said solvent has been removed, heating the residue containing absorbed hydrogen chloride at a temperature of at least 120° C. but below the temperature of decomposition of the isocyanate which is formed, and isolating the said isocyanate by distillation from the heated residue.

6. The method of preparing allyl isocyanate which comprises distilling a solution of triallyl isocyanurate in an organic solvent which is inert to the said isocyanurate and its pyrolysis products, said solution containing absorbed hydrogen chloride and said distillation being continued until the said solvent has been removed, heating the residue containing absorbed hydrogen chloride at a temperature within the range of 180° C. to 270° C., and isolating allyl isocyanate by distillation from the heated residue and condensing the distillate.

7. The method of preparing allyl isocyanate which comprises passing dry hydrogen chloride gas into a solution of triallyl isocyanurate dissolved in dry toluene until the said solution has been saturated with hydrogen chloride, distilling the said solution to remove the toluene, heating the residue containing absorbed hydrogen chloride at a temperature within the range of 180° C. to 220° C., and isolating allyl isocyanate by distillation from the heated residue and condensing the distillate.

8. The method of preparing an aliphatic hydrocarbon isocyanate represented by the formula RNCO, where R represents an aliphatic hydrocarbon grouping wherein any unsaturation is ethylenic unsaturation, said method comprising passing dry hydrogen chloride gas into the corresponding tri-(aliphatic hydrocarbon) isocyanurate while heating the latter at a temperature of at least 120° C. but below the temperature of decomposition of the isocyanate which is formed, and recovering the said isocyanate.

9. The method of preparing allyl isocyanate which comprises passing dry hydrogen chloride gas into triallyl isocyanurate while heating the latter at a temperature within the range of 180° C. to 270° C., and recovering the the allyl isocyanate which is formed.

FREDERIC C. SCHAEFER.
ERHART K. DRECHSEL.

No references cited.